INVENTOR.
M. R. CINES
P. E. WILKINS

BY *Young & Quigg*

ATTORNEYS

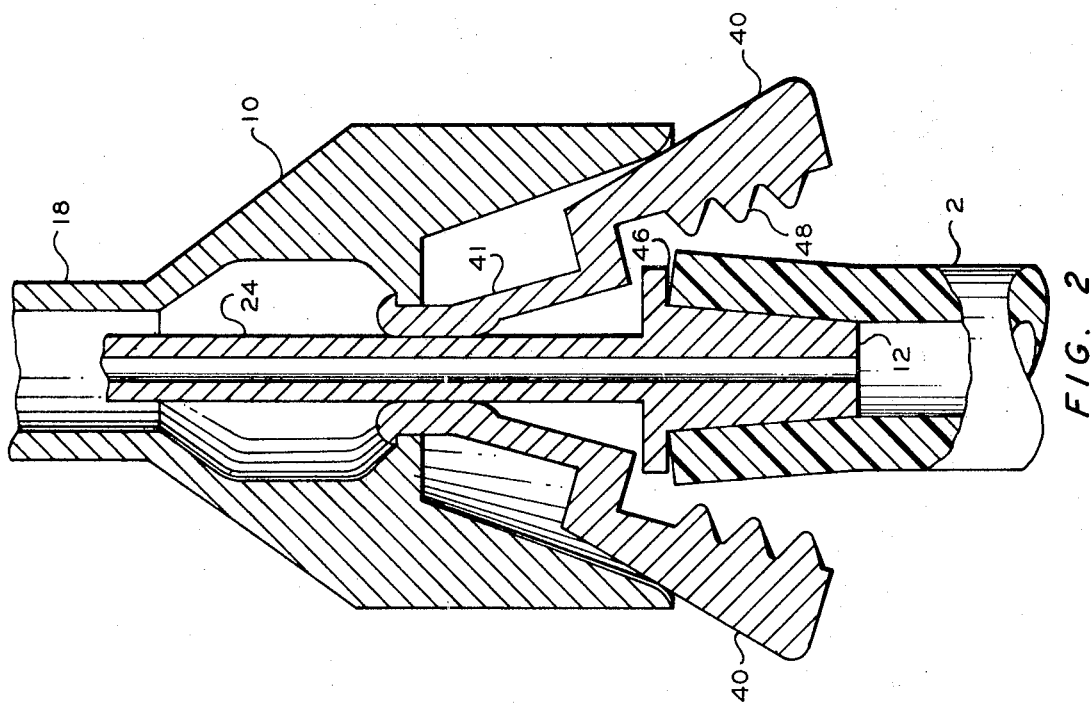
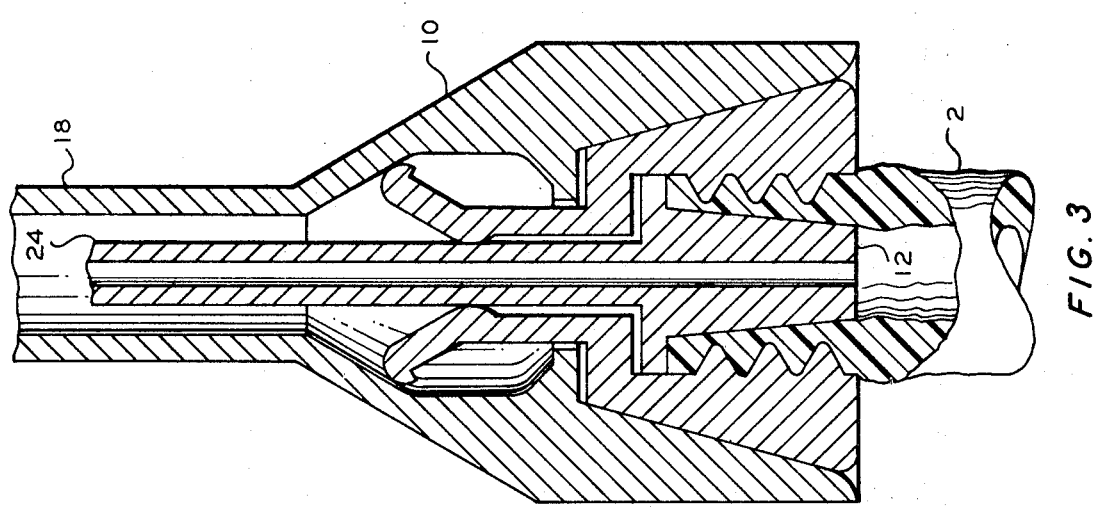

INVENTOR.
M.R. CINES
P.E. WILKINS

BY Young & Quigg

ATTORNEYS

INVENTOR.
M.R. CINES
P.E. WILKINS
BY
*Young & Quigg*
ATTORNEYS

United States Patent Office 3,525,123
Patented Aug. 25, 1970

3,525,123
APPARATUS FOR MOLDING BIAXIALLY ORIENTED ARTICLES
Martin R. Cines and Paul E. Wilkins, Bartlesville, Okla., assignors to Phillips Petroleum Company, a corporation of Delaware
Filed Apr. 17, 1967, Ser. No. 631,531
Int. Cl. B29c 17/07; B29d 23/03
U.S. Cl. 18—5                                          2 Claims

ABSTRACT OF THE DISCLOSURE

This disclosure relates to a biaxial orientation process and apparatus whereby a parison is heated, stretched and put into a double mold cavity wherein it is pinched in the center thereof and blown to form an article.

---

Figure 1:
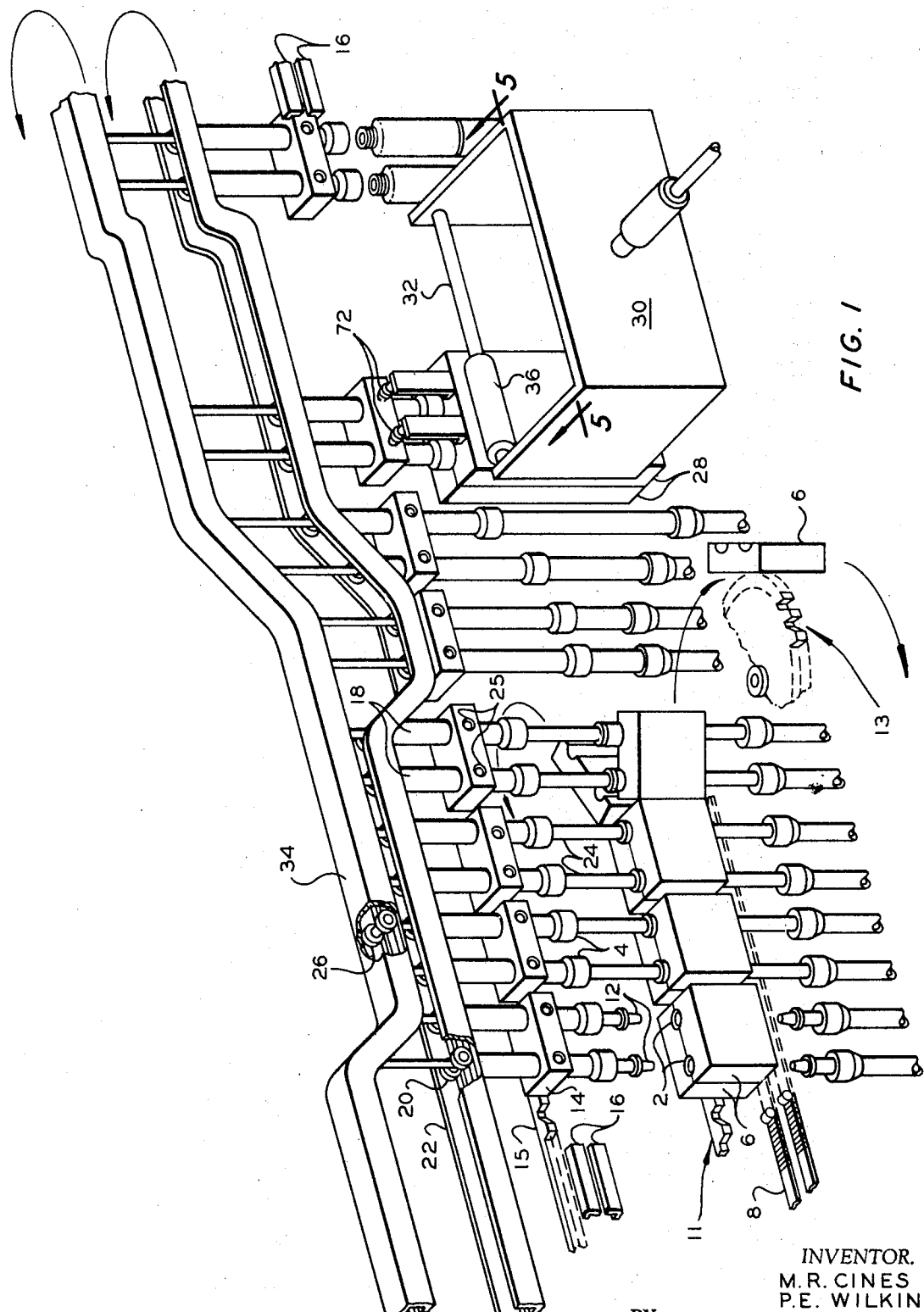

In application Ser. No. 153,355, filed Nov. 20, 1961, now abandoned, there is disclosed a process and apparatus for making biaxially oriented articles by heating a parison to a temperature below the crystalline melt point, stretching the parison longitudinally and then expanding the parison in a radial direction.

In copending application, Ser. No. 489,934, filed Sept. 24, 1965, now U.S. Pat. 3,390,426, there is disclosed and claimed a method and apparatus for producing a biaxially oriented article wherein a preheated parison is grasped at one end thereof by a gripping means and at the other end thereof by a pinch-off device. A tamping foot presses against the sealed area made by the pinch-off device to provide an improved seal and to hold the parison in place at the pinch-off device. The parison is then stretched longitudinally. A portion of the parison below the seal area is severed from the parison and removed. The parison is then placed into a mold and expanded radially. In this process, there is a salvage or waste portion or flash or tail from the parison.

We have now discovered that in molding biaxially oriented thermoplastic articles, at least a portion of the salvage or flash or tail can be eliminated by grasping each end of a heated parison with a gripping means, stretching the parison, and placing the same in a double cavity mold, and expanding the parison to conform with the shape of the mold cavity. The parison can be pinched off to seal the same between the cavities of the double mold if desirable. The stretching of the parison prior to the pinching off of the same permits an adequate seal to be made within the mold without the use of a tamping foot as has been hereinbefore described with regard to application Ser. No. 489,934, filed Sept. 24, 1965.

The use of multiple molds to produce a plurality of articles from a single parison is well known and disclosed in Hobson Re. 23,564. Hobson, however, uses a molten parison and does not stretch his parison prior to pinching his parison off to form the separate blown articles. Thus, Hobson does not produce a biaxially oriented article and does not have the problem of providing a strong seal in the pinch-off area.

By various aspects of this invention, one or more of the following or other objects can be obtained.

It is an object of this invention to provide an improved apparatus for molding biaxially oriented articles.

It is a further object of this invention to provide an improved method and apparatus for blow molding biaxially oriented articles wherein waste material is materially reduced or completely eliminated.

It is a still further object of this invention to provide an improved apparatus for forming biaxially oriented articles in which an adequate seal is accomplished in a parison without the use of equipment for tamping the seal area.

Other aspects, objects, and the several advantages of this invention are apparent to one skilled in the art from a study of this disclosure, the drawings, and the appended claims.

According to the invention, multiple biaxially oriented articles are produced by heating a parison to a temperature below the crystalline melt point, stretching the parison longitudinally, placing the parison into a multiple mold cavity wherein the article is expanded radially to conform to the shape of the mold. In a preferred embodiment, a pinch-off device within the mold cavity pinched off the parison and seals off the parison in each portion of the mold cavity.

In another embodiment of the invention, the heated parison is grasped at either end by a die which forms a portion of the finished article and the parison is longitudinally stretched. Thereafter, a mold is clamped around the parison and the parison is pinched off in the central portion thereof. Each portion of the pinched-off parison is expanded to produce a pair of biaxially oriented bottles with no flash or waste material.

In another embodiment, there is provided an apparatus for continually producing a plurality of articles.

Figure 4:
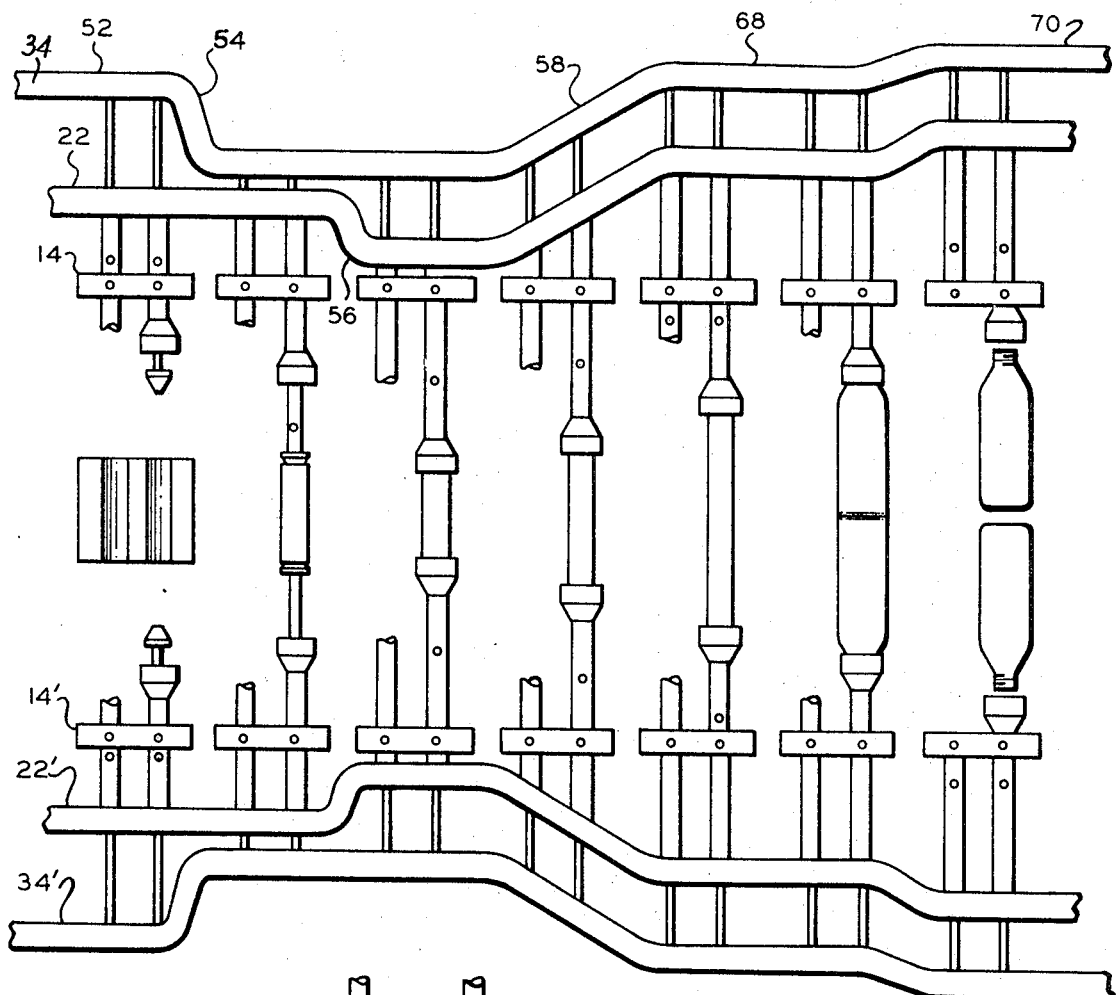
Figure 5:
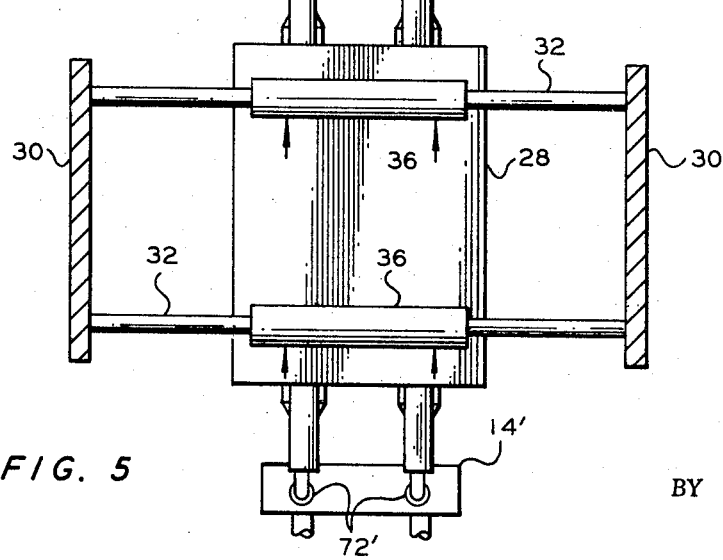
Figure 6B:
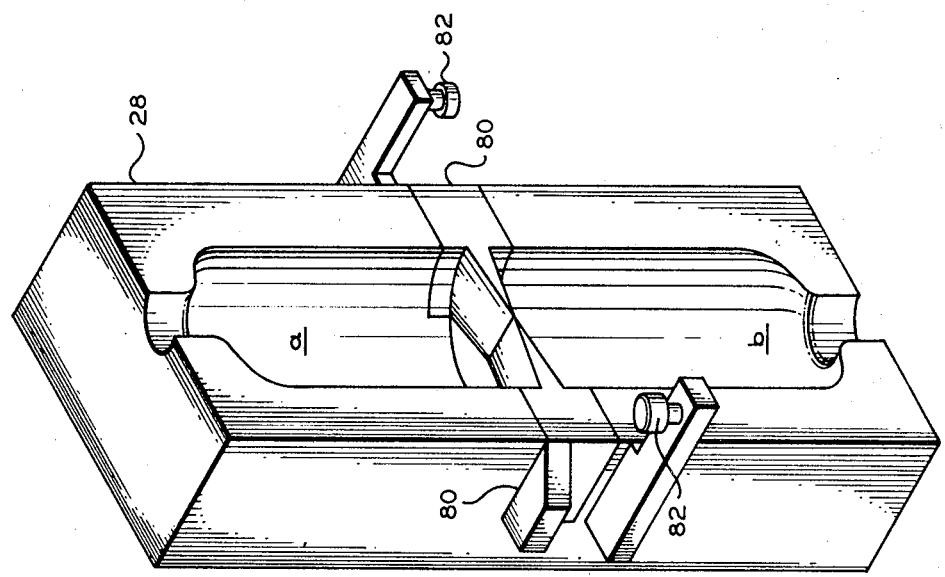
Figure 6A:
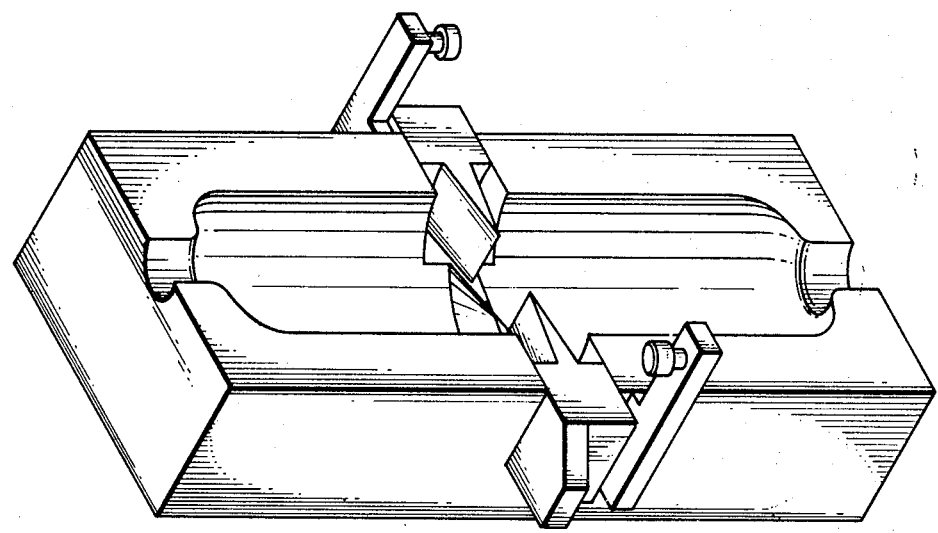

The invention will now be described with reference to the accompanying drawings in which FIG. 1 is an isometric view of an apparatus designed to carry out the process according to the invention; FIG. 2 is a view of a gripping means shown in FIG. 1 in the open position; FIG. 3 is a view of the gripping means shown in FIG. 2 in the closed position; FIG. 4 is a partial elevation of the apparatus shown in FIG. 1; FIG. 5 is a view along lines 5—5 of FIG. 1; FIG. 6A is a view of a mold with pinch-off members in a retracted position; and FIG. 6B is a view of the mold of FIG. 6A with the pinch-off members closed.

Referring now to the drawings, a plurality of parisons 2 are placed in a multicavity heating mold defined by mold halves 6. The parison can be placed in the heating mold either manually or automatically. Heating mold halves 6 carry the parisons along a continuous roller belt 8 through the two heating zones where the mold halves are heated and in turn heat the parisons enclosed in the mold cavities. Mold halves 6, activated by chain and sprocket conveying means 11 and 13, are separated after the parisons have been heated to release the parisons. The mold halves 6 are then returned to a parison loading station where unheated parisons are placed therebetween as the mold halves 6 are brought together. Before the heated parisons are released from heating mold halves 6, they are engaged at each end by mandrel tips 12. After the parisons are released from heating mold halves 6, they are engaged at each end by thread forming and gripping means 4. Mandrel 24 with mandrel tip 12 is slidably supported by and is concentric with thread forming means 4 and its supporting tube 18. Supporting tube 18 is slidably supported in chain carried block 14 which is slidably engaged by guide rails 16. A plurality of blocks 14, each carrying a plurality of supporting tubes 18, is carried in a continuous path by chain and sprocket conveying means 15. Tubes 18, with wheels 20 rotatably attached to their outer end and engaging cam track 22, move thread forming means 4 over the ends of the parison 2 as a result of the cam tracks 22 acting on wheels 20 and, in conjunction with mandrel tips 12, balls 10 cause jaws 40 to close on the ends of the parisons, thus forming threads on them. Mandrels 24 are positioned by cam tracks 34 engaging wheels 26 on the outer ends of mandrels 24.

After the parisons have been heated and the threads formed on each end, they are stretched due to the shape of cam tracks 22 and 34 (and corresponding lower cam tracks) pulling apart upper and lower gripping means 4. The lower cam tracks 22' and 34' are a mirror image of the upper cam tracks 22 and 34. The parisons are passed in between a pair of mold halves 28 which contain plural cavities therein. The mold halves 28 are supported on air or hydraulic cylinders 36 having rods 32 attached to the sides of mold platen 30. The mold halves 28 move along the line of blocks 14 by the actuation of air or hydraulic cylinders 36 and move back and forth by the actuation perpendicular to the line of movement of blocks 14 of mold platen 30.

Referring now specifically to FIG. 2, each end of parison 2 is placed over mandrel tip 12 having shoulder 46. A plurality of jaws 40 pivotable about point 41 is actuated by bell 10 to open and close the jaws. Jaws 40 have a die 48 which clamps over the heated end of parison 2 to form the threaded neck of a finished bottle. Thus, the gripping means comprising mandrel tip 12, jaws 40, and bell 10 grasp the end of the parison and thereby form a portion of the finished article. Mandrel tip 12 is attached to mandrel 24 which is hollow in the center to allow air to pass through mandrel 24 and through mandrel tip 12 into the inner portion of parison 2. The air enters mandrel 24 through holes 25 when the mandrel 24 is in the up position as at the mold halves shown in FIG. 1. Air is supplied through nozzles 72 which are supported on mold halves 28.

FIG. 3 shows the position of bell 10, jaws 40, and parison 2 in the closed position as the parison is grasped and the threads formed. The gripping means shown in FIGS. 2 and 3 represent the upper and lower gripping means shown in FIG. 1.

Referring now specifically to FIG. 4, there is schematically shown the operation of cam tracks 22 and 34. Cam track 34 maintains mandrel 24 in the up position at 52 and then causes the mandrel to dip down and the mandrel tip 12 to be inserted in the parison at 54, when the parison is still within the heating mold halves 6. At 56, cam track 22 causes bell 10 to push in on jaws 40 and clamp around parison 2. At section 58, both cam track 34 and cam track 22 diverge to stretch the parison. At section 68, cam tracks 22 and 34 cease stretching the parison and maintain a relatively constant position of the upper and lower gripping means, at which time the parison is blown to the final artcile. At position 70, cam tracks 22 raise the upper and lower bells and thereby release the blown article from the gripping means. At the beginning part of the cycle, cam tracks 34 move mandrel tips 12 toward one another to engage the ends of the parisons while they are still in the heating cavity then after the heater mold halves 6 are removed cam tracks 22 force closed gripping means 4, as has been described and the parison is clamped and the threads formed at each end.

Referring now to FIG. 5, as the parison moves along the track, it is positioned within mold halves 28. The mold halves 28 are attached to fluid cylinders 36 which actuate the mold to slide along rods 32. The fluid for cylinders 36 can be gas or liquid. When mold 28 reaches the right hand portion of mold platen 30, the article has finished blowing and mold platen 30 is quickly retracted and cylinders 36 are actuated to move the mold 28 back to the left hand portion of mold platen 30 as shown in FIG. 5.

Referring now to FIGS. 6A and 6B wherein there is shown a mold which can be used in the invention, the mold half 28 contains at least two chambers $a$ and $b$ and at least a pair of slidable pinch off members 80. When the parison is moved between the mold halves, the sliding members 80 are open as shown in FIG. 6A. As the mold halves close, members 80 are closed by camming rollers 82 to thereby pinch off the parison in the center thereof leaving chambers $a$ and $b$ separated from one another and the parison sealed and severed. The blowing commences through the outlet for each chamber. It is within the scope of this invention to provide a plurality of pinch-off members so that the parison is pinched off to a point as has been disclosed in copending application, Ser. No. 489,934, filed Sept. 24, 1965. Member 82 acts against a member like 80 on an opposing mold half.

In operation, parisons are placed between heater mold halves 6 and the mold halves closed about them to enclose them in heating cavities. The mold halves 6 heat the parison to a desired orientation temperature, i.e., below the crystalline melt point for the thermoplastic material being used. While the parisons are being heated, they move down the line going from left to right of FIGS. 1 and 4 and mandrel tips 12 are inserted into the end portions of parisons 2 due to the action of cam tracks 34. After the mold halves 6 have been separated from the parisons 2, cam tracks 22 actuate bell housing 10 to cause jaws 40 to clamp over the ends of the parisons, thereby forming the threaded neck portion of the bottles. As the heated parisons continue to move down the line, they are longitudinally stretched due to the action of cam tracks 22, and 34, and then passed into the area in which mold cavities 8 clamp around them. If desirable, slidable means 80 are actuated to seal and pinch off the parisons within the cavities. An air supply (not shown) supplies air to nozzles 72 which injects air through holes 25 on blocks 14, which air passes through mandrel 24, mandrel tip 12 and into the central portion of each pinched-off portion of the parison to thereby cause the parison to expand to conform to the shape of the mold cavities. As molding takes place, mold halves 28 move down the line with the parisons. After the blowing operation, the mold halves 28 are separated and retracted and the gripping means 4 release the blown articles.

Whereas the invention has been described with reference to a generally vertical operation wherein the parisons are held vertically, it is within the scope of the invention to provide an operation wherein the parisons are held horizontally throughout the entire operation. In this latter operation, the operation of each gripping means is identical so that both gripping means form portions of the finished article after the parison has been heated.

The mold halves 28 can contain multiple mold cavities. For the sake of illustration, four cavities, two each shown similar to those shown in 6A and 6B, have been provided. It is within the scope of the invention, however, to provide more or less cavities. Preferably, two axially aligned cavities are used for the maximum efficiency in producing biaxially oriented articles with no waste.

The temperature to which the polymers are conditioned while in the heating mold is preferably the maximum orientation temperature of the material from which the parison is made. Generally, these orientation temperatures will be in the range of 2 to 40° F. below the crystalline melt point of the polymers, preferably from 3 to 20° F. below the melt point. For polypropylene the range would be between 300 to 338° F., preferably between 320 and 337° F. For polyethylene the range would be between 237 and 271° F., preferably between 258 and 267° F.

If desirable, the parisons within the mold halves need not be pinched off. This is especially desirable when making containers which are bottom filled. After the filling operation, the bottoms can be welded or heat sealed onto the formed articles.

The thermoplastic material used in the method and apparatus of the invention can be any suitable blow molding thermoplastic material including normally solid polymers of 1-olefins such as polyethylene, polypropylene, polybutene-1 and copolymers thereof. Other polymers such as polystyrene and polyvinylchloride are also suitable.

Reasonable variation and modification are possible within the scope of the foregoing disclosure and drawings without departing from the spirit thereof.

We claim:

1. Apparatus for producing a plurality of biaxially oriented articles from a tubular parison comprising:

(a) means for heating said tubular parison;

(b) a plurality of pairs of gripping means for gripping first and second ends of a plurality of said parisons to form portions of the finished articles, each of said gripping means comprising a mandrel insertable into said end of said tubular parison, a plurality of gripping jaws adapted to clamp over the end portion of said parison, and means for opening and closing said jaws;

(c) mold cavity means having a plurality of cavities therein;

(d) a first pair of continuous cam tracks having a first cam means for advancing said mandrel;

(e) a second pair of continuous cam tracks having a second cam means for activating said means for opening and closing said jaws, said first and second pair of cam tracks having a section so disposed as to move the two gripping means of each pair of gripping means apart, after said mandrel has been advanced and said jaws closed, to longitudinally stretch said tubular parison at a point upstream from said mold means, said cam tracks being further disposed so as to carry said parison gripping means through an area in which said parison is molded in said mold cavity means of (c);

(f) means to move said pairs of parison gripping means on said first and second pair of tracks;

(g) means to seal said parison between said first and second end thereof; and (h) means to expand said thusly stretched and sealed parison to conform with said article cavities.

2. Apparatus according to claim 1 wherein said gripping jaws are rotatable about a point in said mandrel such that in open position said jaws permit insertion of said parison over said mandrel.

References Cited

UNITED STATES PATENTS

| | | | |
|---|---|---|---|
| 2,541,249 | 2/1951 | Hobson | 264—98 X |
| 2,784,457 | 3/1957 | Dunmire. | |
| 2,919,462 | 1/1960 | Friden | 264—99 |
| 3,311,684 | 3/1967 | Heider | 264—98 X |
| 3,394,209 | 7/1968 | Cheney | 264—98 X |
| 1,706,874 | 3/1929 | De Journo. | |
| 2,679,215 | 5/1954 | Truesdell. | |
| 2,792,591 | 5/1957 | Cardot et al. | |
| 2,806,252 | 9/1957 | Bishop. | |
| 3,078,504 | 2/1963 | Koppehelle. | |

FOREIGN PATENTS

| | | |
|---|---|---|
| 379,751 | 7/1964 | Switzerland. |
| 995,249 | 6/1965 | Great Britain. |
| 1,136,815 | 9/1962 | Germany. |

ROBERT F. WHITE, Primary Examiner

T. J. CARVIS, Assistant Examiner

U.S. Cl. X.R.

264—94